(12) United States Patent
Ciaravola et al.

(10) Patent No.: US 11,458,776 B2
(45) Date of Patent: Oct. 4, 2022

(54) TREAD WEAR MONITORING SYSTEM AND METHOD

(71) Applicant: Bridgestone Europe NV/SA [BE/BE], Zaventem (BE)

(72) Inventors: Vincenzo Ciaravola, Rome (IT); Alessandro Boldrini, Rome (IT); Lorenzo Alleva, Rome (IT); Alfredo Corollaro, Rome (IT); Marco Andrea Maggi, Rome (IT); Marco Pascucci, Rome (IT)

(73) Assignee: Bridgestone Europe N.V./S.A., Zaventem (BE)

( * ) Notice: Subject to any disclaimer, the term of this patent is extended or adjusted under 35 U.S.C. 154(b) by 189 days.

(21) Appl. No.: 17/252,015

(22) PCT Filed: Jun. 11, 2019

(86) PCT No.: PCT/IB2019/054847
§ 371 (c)(1),
(2) Date: Dec. 14, 2020

(87) PCT Pub. No.: WO2019/239305
PCT Pub. Date: Dec. 19, 2019

(65) Prior Publication Data
US 2021/0245554 A1  Aug. 12, 2021

(30) Foreign Application Priority Data

Jun. 14, 2018 (IT) .......................... 102018000006322

(51) Int. Cl.
*B60C 11/24* (2006.01)
*G01M 17/02* (2006.01)
(Continued)

(52) U.S. Cl.
CPC ........... *B60C 11/246* (2013.01); *G01M 17/02* (2013.01); *B60C 23/0408* (2013.01); *G01S 19/24* (2013.01)

(58) Field of Classification Search
CPC ............ B60C 23/0435; B60C 23/0416; B60C 23/0489; B60C 23/0488; B60C 23/0415;
(Continued)

(56) References Cited

U.S. PATENT DOCUMENTS

| 2017/0113494 A1* | 4/2017 | Singh ................. B60C 23/0486 |
| 2019/0001757 A1* | 1/2019 | Singh ................. B60C 23/0408 |
| 2021/0394562 A1* | 12/2021 | Singh ................. B60C 23/0408 |

FOREIGN PATENT DOCUMENTS

| EP | 3318422 A1 | 5/2018 |
| WO | 20170149954 A1 | 9/2017 |

(Continued)

OTHER PUBLICATIONS

International Searching Authority: Search Report for co-pending International Patent Application No. PCT/IB2019/054847, dated Dec. 13, 2019, 3 pages.

*Primary Examiner* — Nimeshkumar D Patel
*Assistant Examiner* — Gedeon M Kidanu
(74) *Attorney, Agent, or Firm* — Patterson Intellectual Property Law, P.C.

(57) ABSTRACT

The invention concerns a tread wear monitoring method comprising a tread wear model calibration step (1) and a tread wear monitoring step (2), wherein the tread wear model calibration step (1) includes determining (13) a calibrated tread wear model based on tread-wear-related quantities and first frictional-energy-related quantities. The tread wear monitoring step (2) includes: acquiring (21), from a vehicle bus (40) of a motor vehicle (4) equipped with two or more wheels fitted, each, with a tire, driving-related quantities related to driving of the motor vehicle (4); computing (22) second frictional-energy-related quantities related to frictional energy experienced, during driving, by a given tire of the motor vehicle (4) by providing a predefined vehicle dynamics model that mathematically relates the acquired driving-related quantities to the second frictional-energy-related quantities, and computing the second frictional-energy-related quantities by inputting the acquired driving-related quantities into the predefined vehicle dynamics model; and performing a tread wear estimation (23) and a remaining tread material prediction (24) based on the second frictional-energy-related quantities computed and the calibrated tread wear model. The tread wear model calibration step (1) further includes: performing (11) tread wear tests on one or more tires; and measuring (12) tread-wear-related quantities indicative of tread depth reductions (Continued)

resulting from the performed tread wear tests, and first frictional-energy-related quantities related to frictional energy which the tested tire(s) is/are subject to during the performed tread wear tests. Determining (13) a calibrated tread wear model includes: providing a predefined reference tread wear model that mathematically relates frictional energy experienced by a tire along a driving route to tread wear caused by said frictional energy through given parameters; computing calibration values of the given parameters by inputting the measured tread-wear-related and first frictional-energy-related quantities into the predefined reference tread wear model; and determining the calibrated tread wear model by applying the computed calibration values in the predefined reference tread wear model.

21 Claims, 3 Drawing Sheets

(51) Int. Cl.
B60C 23/04 (2006.01)
G01S 19/24 (2010.01)
(58) Field of Classification Search
CPC ............ B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60G 2800/984; B60T 2240/06; B60T 2240/07; B60T 2240/08; E01F 9/696; F16D 2066/001; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12; H02S 10/12; H02S 20/21; H02S 20/22
See application file for complete search history.

(56) References Cited

FOREIGN PATENT DOCUMENTS

WO  20170156216 A1  9/2017
WO  WO-2017156216 A1 * 9/2017 ........... B60C 11/246

* cited by examiner

TREAD WEAR MONITORING SYSTEM AND METHOD

CROSS-REFERENCE TO RELATED APPLICATIONS

This application claims priority from Italian Patent Application No. 102018000006322 filed on Jun. 14, 2018, the disclosure of which is incorporated by reference.

TECHNICAL FIELD OF THE INVENTION

The present invention relates to a method and a system for tread wear monitoring with the capability to estimate tread wear and predict Remaining Tread Material (RTM) of tires of motor vehicles (e.g., vehicles fitted with internal combustion engines, hybrid vehicles, electric vehicles, etc.).

STATE OF THE ART

As is broadly known, tires of motor vehicles are subject, with use, to deterioration; in particular, tire tread is subject to wear that causes tread depth to reduce over time. When the tread depth reaches a certain end-of-life tread depth, the tire should be replaced in order not to impair driving safety.

Unfortunately, many drivers do not regularly check tread depth of tires of their motor vehicles, with the consequent risk of carrying on driving even when the tread depth of one or more tires has reached (or, even worse, has become lower than) the end-of-life tread depth, thereby running a serious risk of safety. In fact, typically, a common driver owns no tread depth measuring tool and may forget to have tires of his/her motor vehicle periodically checked in a tire shop.

Therefore, in the automotive sector there is markedly felt the need for technologies capable of estimating/predicting RTM.

For example, known solutions of this kind are provided in WO 2017/156213 A1 and WO 2017/156216 A1, which relate to a vehicle integrated expected tread-life indicator system and a driving companion tread-life indicator system, respectively. In particular, both said International applications disclose a computer-implemented method for monitoring tire tread-life, which method comprises:
  receiving, by one or more processors, data associated with one or more tread depth measurements, the one or more tread depth measurements made by a measurement device external to a vehicle, the one or more tread depth measurements descriptive of a tread depth of at least one tread of at least one tire of the vehicle;
  associating, by the one or more processors, a respective time value or a distance value with each of the one or more tread depth measurements;
  accessing, by the one or more processors, a model that correlates the one or more tread depth measurements to a projected tread depth;
  determining, by the one or more processors, an estimated time or an estimated distance at which the projected tread depth is expected to equal or pass a tread depth threshold based at least in part on the model; and
  providing, by the one or more processors, the estimated time or the estimated distance to a notification system. Said notification system is integrated:
  according to WO 2017/156213 A1, into the vehicle whereas,
  according to WO 2017/156216 A1, into a user computing device (e.g., a smartphone or a tablet).

Additionally, US 2017/113494 A1 discloses a tire wear state estimation system configured to estimate forces and sliding velocity generated in a tire contact patch, determine frictional energy from the tire force and sliding velocity, and generate an estimate of tire wear state based upon the frictional work done by the tire. In particular, according to US 2017/113494 A1, a tire wear estimate is made by determining the amount of frictional work performed by the tire through the integrated use of tire-mounted, GPS sourced, and vehicle-mounted sensor information.

Moreover, EP 3 318 422 A1 describes a tire wear state estimation system that comprises: at least one tire supporting a vehicle; a plurality of tire-mounted devices operable to supply tire-specific information affecting tire contact patch dynamics; at least one inertial measurement unit operable to supply sliding velocity information from a tire contact patch formed by the one tire rolling over a ground surface; a friction work estimator operable to calculate a friction work estimate done by the at least one tire from the tire-specific information and the sliding velocity information; and a tire wear rate estimator operable to generate a tire wear rate estimation from drawing a proportional correlation between the tire wear rate estimation and the calculated friction work estimate.

Finally, WO 2017/149954 A1 discloses a tire wear life estimating system that includes:
  a vehicle travel data generating unit that generates and stores data relating to vehicle parameters of a vehicle, which is traveling on a travel path extending from a start point to an end point of straight-line sectors or curved sectors while traveling repeatedly in accordance with travel patterns comprising acceleration, deceleration and turning, where said vehicle parameters include, for example, the vehicle speed, the travel pattern and a tire steering amount;
  a trajectory information generating unit that generates and stores data pertaining to gradient, curve length and the like relating to the travel path;
  a vehicle model generating unit that generates and stores vehicle specifications and the like; and
  a friction energy calculating unit that calculates total friction energy of the tires in all sectors of the travel path by calculating friction energy for each travel mode for each sector of the travel pattern, on the basis of the data stored by the vehicle travel data generating unit, the trajectory information generating unit, and the vehicle model generating unit, and adding together the friction energy calculated for each sector.

OBJECT AND SUMMARY OF THE INVENTION

A first object of the present invention is that of providing a technology for automatically estimating tire tread wear in an efficient and reliable way with neither the necessity for a driver to own a tread depth measuring tool, nor to go to a tire shop to have tread depth of tires of his/her motor vehicle measured.

Moreover, a second object of the present invention is that of providing a technology for predicting RTM, which technology is more efficient and reliable than currently known technologies, such as the expected tread-life indicator systems according to WO 2017/156213 A1 and WO 2017/156216 A1, and the tire wear state estimation system according to US 2017/113494 A1.

These and other objects are achieved by the present invention in that it relates to a tread wear monitoring method and a tread wear monitoring system, as defined in the appended claims.

In particular, the present invention concerns a tread wear monitoring method comprising a tread wear model calibration step and a tread wear monitoring step, wherein the tread wear model calibration step includes determining a calibrated tread wear model based on tread-wear-related quantities and first frictional-energy-related quantities.

The tread wear monitoring step includes:
acquiring, from a vehicle bus of a motor vehicle equipped with two or more wheels fitted, each, with a tire, driving-related quantities related to driving of the motor vehicle;
computing second frictional-energy-related quantities related to frictional energy experienced, during driving, by a given tire of the motor vehicle by
providing a predefined vehicle dynamics model that mathematically relates the acquired driving-related quantities to the second frictional-energy-related quantities, and
computing the second frictional-energy-related quantities by inputting the acquired driving-related quantities into the predefined vehicle dynamics model;
performing a tread wear estimation comprising estimating tread wear experienced by the given tire of the motor vehicle during driving by computing, based on the second frictional-energy-related quantities computed and the calibrated tread wear model, a tread wear value indicative of a reduction in tread depth due to a distance driven by the motor vehicle; and
performing a remaining tread material prediction comprising predicting remaining tread material of the given tire of the motor vehicle by computing a remaining tread depth based on the computed tread wear value and an initial tread depth.

Additionally, the tread wear model calibration step further includes:
performing tread wear tests on one or more tires; and measuring
tread-wear-related quantities indicative of tread depth reductions resulting from the performed tread wear tests, and
first frictional-energy-related quantities related to frictional energy which the tested tire(s) is/are subject to during the performed tread wear tests;
wherein determining a calibrated tread wear model includes:
providing a predefined reference tread wear model that mathematically relates
frictional energy experienced by a tire along a driving route
to tread wear caused by said frictional energy through given parameters;
computing calibration values of the given parameters by inputting the measured tread-wear-related and first frictional-energy-related quantities into the predefined reference tread wear model; and
determining the calibrated tread wear model by applying the computed calibration values in the predefined reference tread wear model.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope of protection consistent with the principles and features disclosed herein and defined in the appended claims.

The present invention concerns a tread wear monitoring method with the capability to estimate tread wear and predict Remaining Tread Material (RTM) of tires of motor vehicles (e.g., vehicles fitted with internal combustion engines, hybrid vehicles, electric vehicles, etc.). Said tread wear monitoring method comprises a tread wear model calibration step and a tread wear monitoring step.

Figure 1:
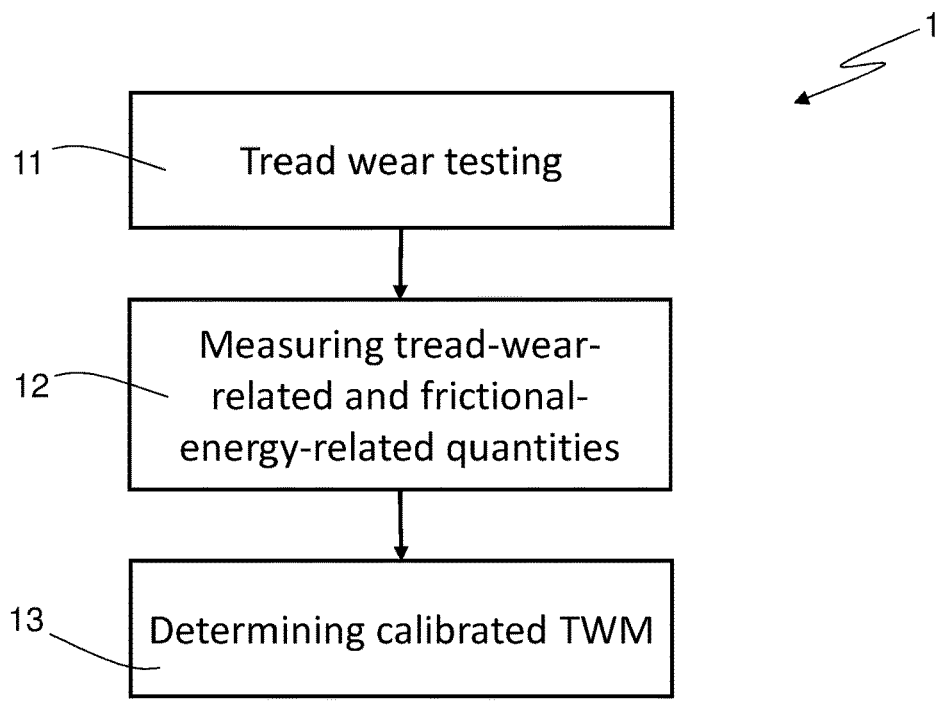
FIGS. 1 and 2 schematically illustrate, respectively, a tread wear model calibration step and a tread wear monitoring step of a tread wear monitoring method according to a preferred embodiment of the present invention.

In this connection, FIG. 1 schematically illustrates (in particular, by means of a flowchart) a tread wear model calibration step (denoted as a whole by 1) according to a preferred embodiment of the present invention. In particular, the tread wear model calibration step 1 includes:
performing tread wear tests on one or more tires (block 11), preferably by using one or more tire test systems/devices/machines, such as one or more indoor wear test machines;
measuring tread-wear-related quantities indicative of tread wear resulting from the performed tread wear tests, and first frictional-energy-related quantities related to frictional energy which the tested tire(s) is/are subject to during the performed tread wear tests (block 12); and
determining a calibrated Tread Wear Model (TWM) based on the measured tread-wear-related and first frictional-energy-related quantities (block 13).

More in detail, determining a calibrated TWM (block 13) includes:
providing a predefined reference TWM that mathematically relates
frictional energy experienced by a (generic) tire along a (generic) driving route
to tread wear caused by said frictional energy through given parameters;
computing calibration values of the given parameters based on the predefined reference TWM and the measured tread-wear-related and first frictional-energy-related quantities (in particular, by inputting said measured tread-wear-related and first frictional-energy-related quantities into the predefined reference TWM), wherein the measured tread-wear-related quantities are indicative of tread depth reductions resulting from the performed tread wear tests; and determining the calibrated TWM based on the predefined reference TWM and the computed calibration values (in particular, by applying the computed calibration values in the predefined reference TWM).

The predefined reference TWM is conveniently based on a predefined mathematical formulation of tire wear physics, whose parameters can be computed on the basis of measurements of the tread wear and of the frictional energy during the tread wear tests. In particular, the predefined mathematical formulation is based on the observation that a tread of a tire is worn of an amount proportional to the frictional energy that the tire experiences along a driving route, and to its intrinsic capability to withstand abrasion. For example, the predefined reference TWM may be expressed in mathematical terms as:

$$W_T = f_{n,k,\ldots}(E_{FR}) \quad (1)$$

where
- $E_{FR}$ denotes the frictional energy experienced by a (generic) tire along a (generic) driving route,
- $W_T$ denotes the tread wear (e.g., expressed in terms of average tread skid loss, i.e., average tread depth reduction over tread width) due to the frictional energy $E_{FR}$, and
- $f_{n,k,\ldots}(E_{FR})$ denotes a predefined mathematical function of the frictional energy $E_{FR}$, which predefined mathematical function is characterized by a set of given parameters n, k, . . . and allows computing, based on the frictional energy $E_{FR}$, the tread wear $W_T$ due to said frictional energy $E_{FR}$.

Preferably, the predefined reference TWM and, hence, the equation (1) may be advantageously expressed according to the following mathematical formula:

$$W_T = k \cdot (E_{FR})^n, \quad (2)$$

wherein
- n is related to full tire resistance to wear (abradability) and
- k is related to tire sensitivity to wear by external factor (e.g., surface).

In particular, the parameters n and k define the shape of the function "wear vs frictional energy", which is specific of each tire model (pattern, compound, construction).

In turn, the frictional energy $E_{FR}$ may be expressed, in either of the equations (1) and (2), as:

$$E_{FR} = g(Q_1, Q_2, Q_3, \ldots) \quad (3)$$

where
- $Q_1, Q_2, Q_3, \ldots$ denote frictional-energy-related quantities that typically vary along a driving route (wherein said frictional-energy-related quantities $Q_1, Q_2, Q_3, \ldots$ may conveniently include one or more of the following quantities: total cornering and longitudinal forces, sliding forces, slip angle, slip ratio, cornering stiffness, braking/traction stiffness, etc.), and
- $g(Q_1, Q_2, Q_3, \ldots)$ denotes a predefined function of the frictional-energy-related quantities $Q_1, Q_2, Q_3, \ldots$, which predefined mathematical function allows computing the overall frictional energy $E_{FR}$ experienced by a (generic) tire over a driving route on the basis of the frictional-energy-related quantities $Q_1, Q_2, Q_3, \ldots$ over said driving route.

In view of the foregoing, it is clear that, by measuring the first frictional-energy-related quantities (block 12 in FIG. 1) during the tread wear tests performed (block 11 in FIG. 1), it is possible to compute (block 13 in FIG. 1) the overall frictional energy $E_{FR}$ experienced by the tire(s) under test on the basis of the equation (3). Then, it is possible to compute (again block 13 in FIG. 1) the set of given parameters n, k, . . . based on the equation (1), the overall frictional energy $E_{FR}$ computed based on the equation (3), and the tread-wear-related quantities measured (block 12 in FIG. 1) for the tread wear tests. Otherwise, it is possible to compute (block 13 in FIG. 1) the given parameters n and k based on the equation (2), the overall frictional energy $E_{FR}$ computed based on the equation (3), and the tread-wear-related quantities measured (block 12 in FIG. 1) for the tread wear tests.

Conveniently, as for the tread wear testing (block 11 in FIG. 1), it is possible to define a driving route to be simulated and, then, simulate said driving route by one or more tire test systems/devices/machines, such as one or more indoor wear test machines, which provide(s), during the performed tread wear tests, measurements of the first frictional-energy-related quantities (e.g., total cornering and longitudinal forces, slip angle, slip ratio, cornering stiffness, etc.). Instead, the tread-wear-related quantities may be conveniently measured after each simulated driving route by means of a tread depth measuring tool.

From the foregoing, it is clear that the tread wear model calibration step 1 allows obtaining, for each type/model of tire, a respective specifically-calibrated TWM. Conveniently, the tread wear model calibration step 1 may be carried out to obtain, for each type/model of tire, a plurality of respective specifically-calibrated TWMs depending on mounting position of a tire on a motor vehicle, such as a first calibrated TWM for tires mounted on front wheels and a second calibrated TWM for tires mounted on rear wheels, or even, in case of four-wheeled motor vehicles, a first calibrated TWM for a tire mounted on a front right wheel, a second calibrated TWM for a tire mounted on a front left wheel, a third calibrated TWM for a tire mounted on a rear right wheel, and a fourth calibrated TWM for a tire mounted on a rear left wheel.

Figure 2:
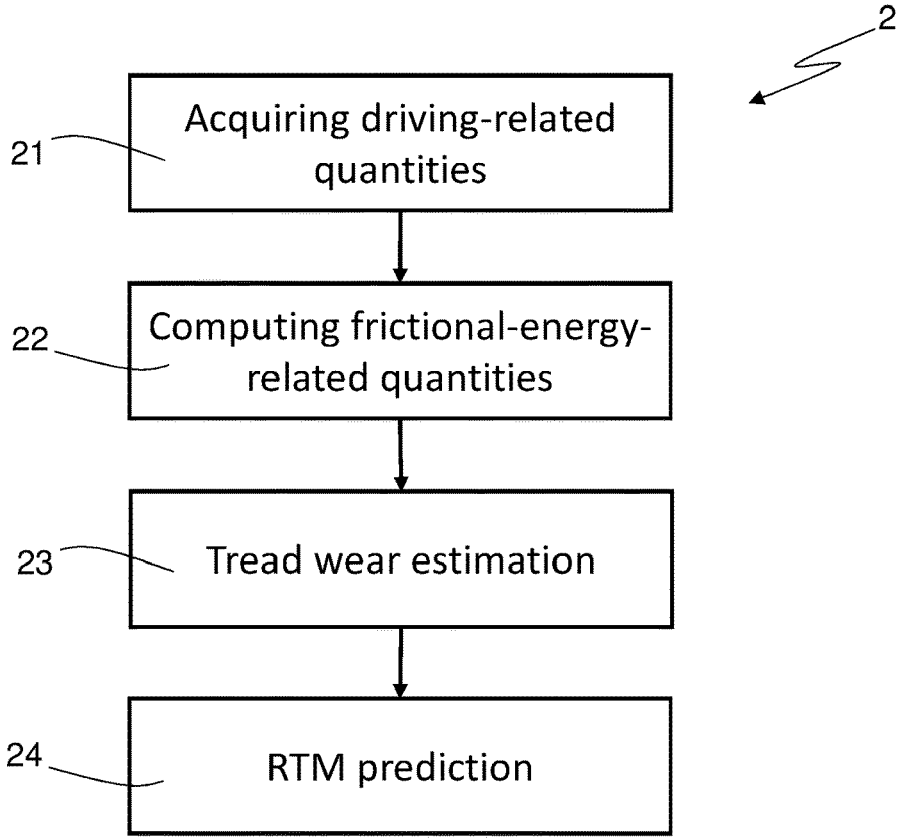

Additionally, FIG. 2 schematically illustrates (in particular, by means of a flowchart) a tread wear monitoring step (denoted as a whole by 2) according to a preferred embodiment of the present invention. In particular, the tread wear monitoring step 2 includes:

acquiring, from a vehicle bus of a motor vehicle (e.g., a scooter, a motorbike, a car, a van, a truck, etc.) equipped with two or more wheels fitted, each, with a tire, driving-related quantities (e.g., longitudinal and transversal accelerations, speed, steering angle, yaw rate, vehicle side slip, wheel angular speed, etc.) related to driving of the motor vehicle (block 21);

computing, based on the acquired driving-related quantities and a predefined vehicle dynamics model related to the motor vehicle, second frictional-energy-related quantities related to frictional energy experienced, during driving, by a given tire (e.g., of a front/rear and/or right/left wheel) of the motor vehicle (block 22);

performing a tread wear estimation (block 23) comprising estimating, based on the second frictional-energy-related quantities and the calibrated TWM, tread wear experienced by the given tire of the motor vehicle during driving; and performing a RTM prediction (block 24) comprising predicting RTM of the given tire of the motor vehicle based on the estimated tread wear.

More in detail, computing the second frictional-energy-related quantities (block 22) includes:

- providing a predefined vehicle dynamics model that is related to the motor vehicle and that mathematically relates
  - the driving-related quantities (e.g., longitudinal and transversal accelerations, speed, steering angle, yaw rate, vehicle side slip, wheel angular speed, etc.) acquired from the vehicle bus of the motor vehicle during driving
  - to the second frictional-energy-related quantities related to the frictional energy experienced, during driving, by the given tire of the motor vehicle; and
- computing said second frictional-energy-related quantities based on the predefined vehicle dynamics model and the acquired driving-related quantities (in particular, by inputting said acquired driving-related quantities into the predefined vehicle dynamics model).

The predefined vehicle dynamics model is conveniently based on a predefined mathematical formulation of dynamics of the motor vehicle, which predefined mathematical formulation allows computing, based on measurements carried out on board the vehicle (i.e., the measurements producing the driving-related quantities), forces and slippages experienced by the tires during driving. For example, the predefined vehicle dynamics model may be expressed in mathematical terms as:

$$Q_1, Q_2, Q_3, \ldots = h(P_1, P_2, P_3, \ldots) \quad (4)$$

where

- $P_1, P_2, P_3, \ldots$ denote the acquired driving-related quantities (which, as previously explained, may include longitudinal and transversal accelerations, speed, steering angle, yaw rate, vehicle side slip, wheel angular speed, etc.),
- $Q_1, Q_2, Q_3, \ldots$ denote, in this case, the second frictional-energy-related quantities (e.g., total cornering and longitudinal forces, slip angle, slip ratio, cornering stiffness, etc.), and
- $h(P_1, P_2, P_3, \ldots)$ denotes a predefined mathematical function of the acquired driving-related quantities $P_1, P_2, P_3, \ldots$, which predefined mathematical function allows computing, based on said acquired driving-related quantities $P_1, P_2, P_3, \ldots$, the second frictional-energy-related quantities $Q_1, Q_2, Q_3, \ldots$.

Thence, once the second frictional-energy-related quantities $Q_1, Q_2, Q_3, \ldots$ have been computed based on the acquired driving-related quantities $P_1, P_2, P_3, \ldots$ and the equation (4), it is possible to estimate tread wear experienced by the tires of the motor vehicle during driving by inputting the second frictional-energy-related quantities $Q_1, Q_2, Q_3, \ldots$ into the calibrated TWM (block 23 in FIG. 2); namely, by inputting the second frictional-energy-related quantities $Q_1, Q_2, Q_3, \ldots$ into the predefined reference TWM characterized by the calibration values of the given parameters computed in the tread wear model calibration step 1.

In extreme synthesis, in the tread wear model calibration step 1, the tread-wear-related quantities (i.e., $W_T$ in the equations (1) and (2)) and the first frictional-energy-related quantities (i.e., $Q_1, Q_2, Q_3, \ldots$ in the equation (3)) are "known", whereas the given parameters (i.e., n, k, . . . in the equation (1), and n and k in the equation (2)) are "unknown" but may be computed by using the equations (1) and (3), or (2) and (3).

Instead, in the tread wear monitoring step 2, the given parameters (i.e., n, k, . . . in the equation (1), and n and k in the equation (2)) are known from the tread wear model calibration step 1, and also the driving-related quantities (i.e., $P_1, P_2, P_3, \ldots$ in the equation (4)) are "known" from the measurements on board the vehicle. Therefore, the tread wear (i.e., $W_T$ in the equations (1) and (2)) may be estimated by using the equations (1), (3) and (4), or (2), (3) and (4).

Conveniently, for each type/model of motor vehicle, a respective predefined vehicle dynamics model is used in the tread wear monitoring step 2 to compute the second frictional-energy-related quantities (block 22 in FIG. 2). More conveniently, for each type/model of motor vehicle, a plurality of respective predefined vehicle dynamics models may be used to take account of different mounting positions of the tires on a motor vehicle (i.e., front and rear wheels, or front right and left wheels and rear right and left wheels).

The tread wear estimation (block 23 in FIG. 2) includes computing, based on the second frictional-energy-related quantities and the calibrated TWM, a tread wear value indicative of a reduction in tread depth due to a distance driven by the motor vehicle, and the RTM prediction (block 24 in FIG. 2) includes computing a remaining tread depth based on the tread wear value and an initial tread depth. Conveniently, the remaining tread depth is expressed in terms of a percentage of remaining tread depth with respect to the initial tread depth.

Additionally, the RTM prediction (block 24 in FIG. 2) conveniently includes detecting an approaching end-of-life condition for the given tire of the motor vehicle if the remaining tread depth reaches a predefined threshold (e.g., if the remaining tread depth percentage reaches, or falls below, 20% of the initial tread depth).

Preferably, the tread wear estimation (block 23 in FIG. 2) and the RTM prediction (block 24 in FIG. 2) are carried out every N kilometers/miles driven by the motor vehicle, wherein N denotes a predefined positive integer (e.g., N may be equal to 5000 or 10000, or even a smaller number of kilometres/miles).

Accuracy and reliability of the tread wear estimation (block 23 in FIG. 2) and of the RTM prediction (block 24 in FIG. 2) may be conveniently enhanced if the driver/owner of the motor vehicle under tread wear monitoring goes to a tire shop to have the tread depth of the tires of his/her motor vehicle measured. In fact, the estimated tread wear and the predicted RTM may be advantageously corrected based on tread depth measurements performed by means of a tread depth measuring tool (since said measurements allows wiping out estimation and prediction errors and, hence, resetting the tread wear estimation and the RTM prediction).

Figure 3:
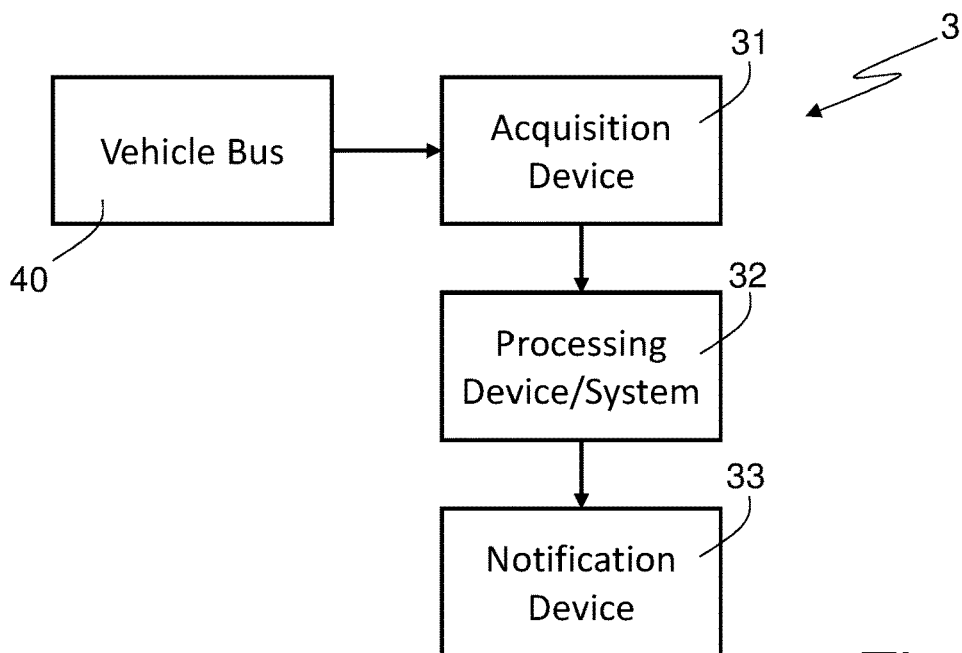
FIG. 3 schematically illustrates a tread wear monitoring system according to a preferred embodiment of the present invention for carrying out the tread wear monitoring step of FIG. 2.

Additionally, the present invention concerns also a tread monitoring system. In this respect, FIG. 3 schematically illustrates (in particular, by means of a block diagram) a functional architecture of a tread wear monitoring system (denoted as a whole by 3) according to a preferred embodiment of the present invention, wherein said tread wear monitoring system 3 is designed to carry out the tread wear monitoring step 2.

In particular, the tread wear monitoring system 3 includes:
- an acquisition device 31, which is
  - installed on board a motor vehicle (not shown in FIG. 3—e.g., a scooter, a motorbike, a car, a van, a truck, etc.) equipped with two or more wheels fitted, each, with a tire, and
  - coupled to a vehicle bus 40 (e.g., based on Controller Area Network (CAN) bus standard) of said motor vehicle to acquire the driving-related quantities (block 21 in FIG. 2);

a processing device/system 32, which is connected, in a wired or wireless fashion, to the acquisition device 31 to receive therefrom the driving-related quantities, and which is programmed to compute the second frictional-energy-related quantities (block 22 in FIG. 2), perform the tread wear estimation (block 23 in FIG. 2), and perform the RTM prediction (block 24 in FIG. 2); and a notification device 33 configured to inform a user associated with the motor vehicle (e.g., a driver and/or an owner thereof) of the RTM predicted by the processing device/system 32.

Conveniently, the notification device 33 is configured to warn the user associated with the motor vehicle against an approaching end-of-life condition detected by the processing device/system 32 for a tire of the motor vehicle.

Figure 4:
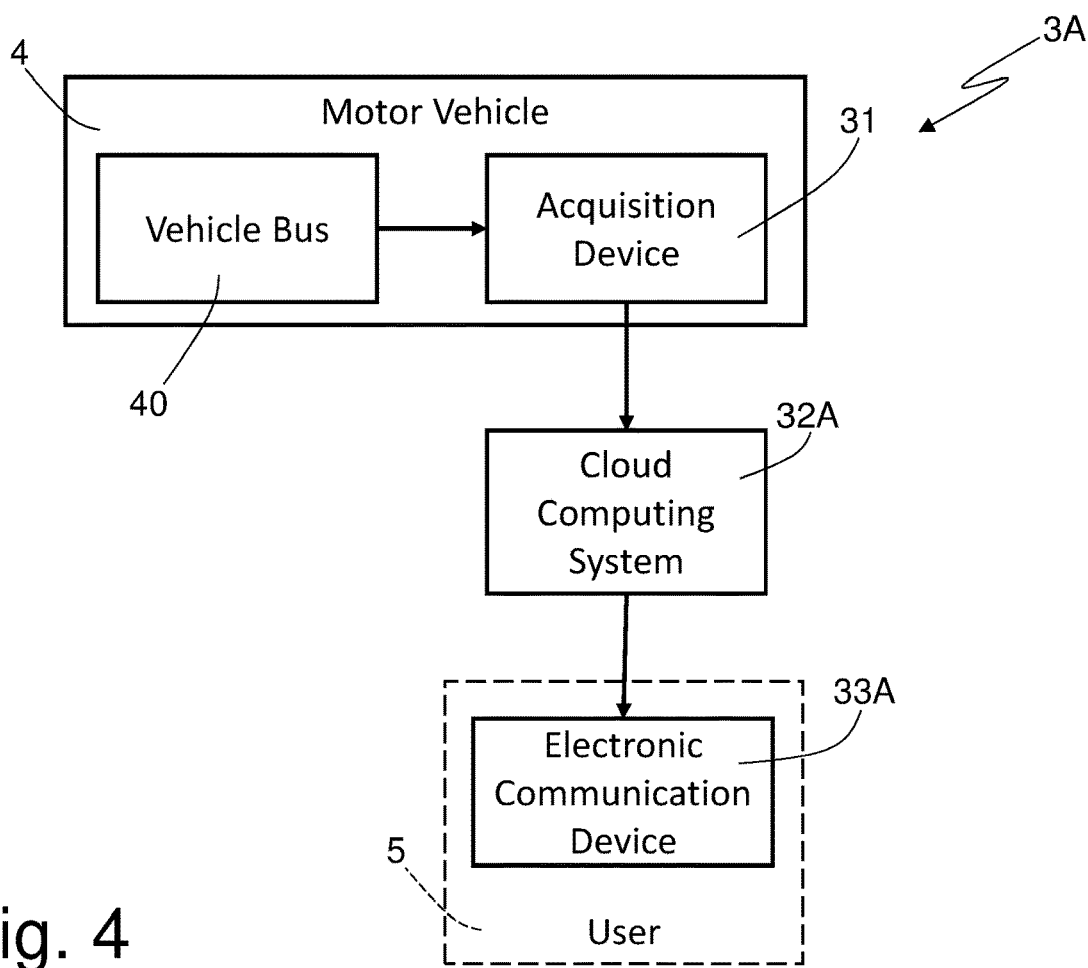
FIGS. 4 and 5 schematically illustrate two specific preferred embodiments of the tread wear monitoring system of FIG. 3.
Figure 5:
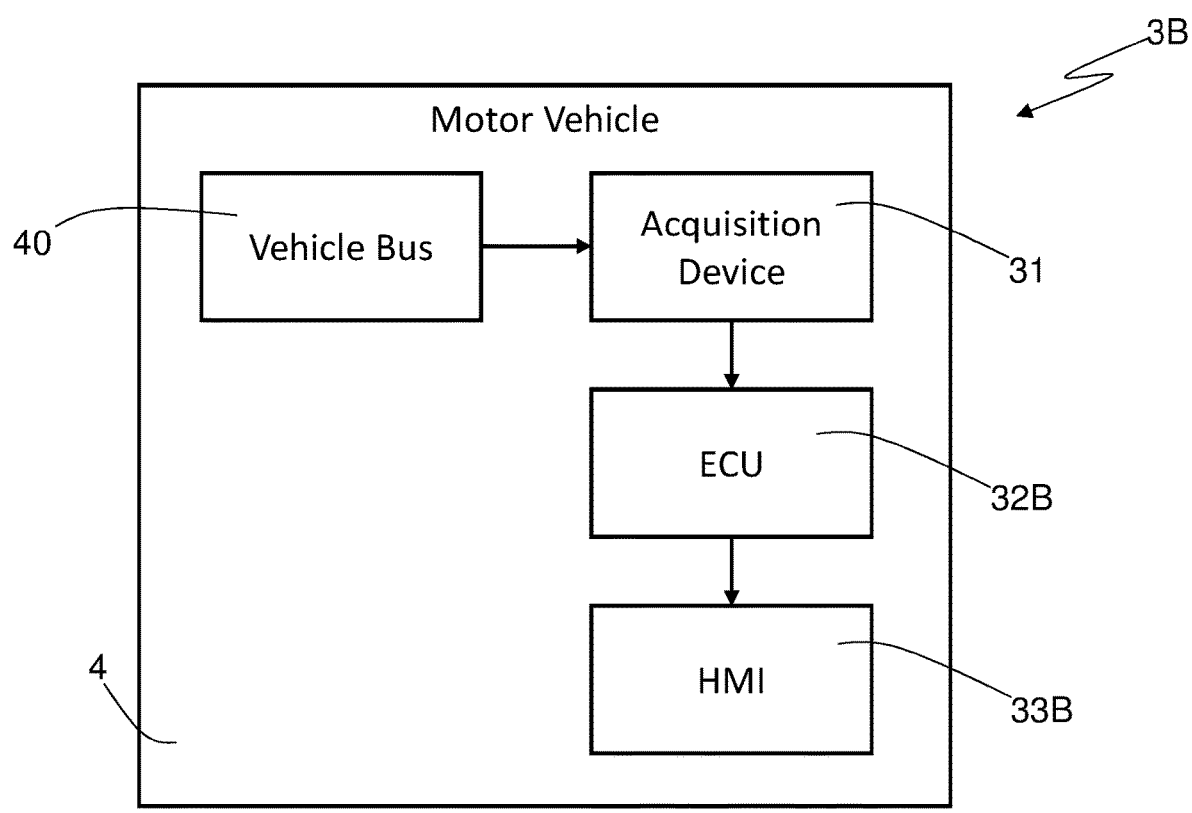

FIGS. 4 and 5 schematically illustrate two specific preferred embodiments of the tread wear monitoring system 3.

In particular, with reference to FIG. 4, in a first specific preferred embodiment (denoted as a whole by 3A) of the tread wear monitoring system 3:

the processing device/system 32 is implemented/carried out by means of a cloud computing system 32A that is wirelessly and remotely connected to the acquisition device 31 (e.g., via one or more mobile communications technologies, such as GSM, GPRS, EDGE, HSPA, UMTS, LTE, LTE Advanced and/or future 5th generation (or even beyond) wireless communications systems); and the notification device 33 is implemented/carried out by means of an electronic communication device 33A (such as a smartphone, a tablet, a laptop, a desktop computer, a smart TV, a smartwatch, etc.), which is associated with (e.g., owned and/or used by) the user (in FIG. 4 denoted by 5) associated with the motor vehicle (in FIG. 4 denoted by 4), and which is remotely connected to the cloud computing system 32A via one or more wired and/or wireless networks.

Preferably, the cloud computing system 32A is programmed to send a RTM notification to the electronic communication device 33A that, then, provides the user 5 with said RTM notification. For example, the electronic communication device 33A may conveniently be a smartphone or tablet on which a software application (i.e., a so-called app) is installed, which app is configured to receive, from the cloud computing system 32A, a push notification indicating the predicted RTM of the tires. Other types of RTM notification may be also used, such as SMS messages, email messages or, more in general, messages of text and/or audio and/or image and/or video and/or multimedia type(s).

It is worth noting that the cloud computing system 32A may be advantageously used to provide many motor vehicles 4 and, hence, many users 5 with a tread wear monitoring service.

Instead, with reference to FIG. 5, in a second specific preferred embodiment (denoted as a whole by 3B) of the tread wear monitoring system 3:

the processing device/system 32 is implemented/carried out by means of an (automotive) Electronic Control Unit (ECU) 32B installed on board the motor vehicle 4; and the notification device 33 is implemented/carried out by means of a Human-Machine Interface (HMI) 33B provided on board the motor vehicle 4.

In said second specific preferred embodiment 3B, the ECU 32B may conveniently inform a driver of the motor vehicle 4 of the predicted RTM of the tires via a graphical message displayed by the HMI 33B (which, thence, may conveniently comprise a screen and/or a graphical indicator).

The ECU 32B may conveniently be an ECU specifically dedicated to tread wear monitoring, or an ECU dedicated to several tasks including also tread wear monitoring.

Similarly, the HMI 33B may conveniently be a HMI specifically dedicated to tread wear monitoring, or a HMI dedicated to several tasks including also tread wear monitoring (e.g., a HMI of an onboard infotelematics and/or driver assistance system).

From the foregoing, the technical advantages and the innovative features of the present invention are immediately clear to those skilled in the art.

In particular, it is important to point out that the present invention allows automatically estimating tire tread wear in a very efficient and reliable way with neither the necessity for a driver to own a tread depth measuring tool, nor to go to a tire shop to have tread depth of tires of his/her motor vehicle measured. In this connection, it is worth noting that the tread wear monitoring method and system according to the present invention efficiently take account of tire wear physics, vehicle dynamics and driving style, thereby allowing carrying out an accurate tread wear estimation and, hence, an accurate RTM prediction.

In this respect, it is worth noting that, even combining the technical teachings provided by the currently known solutions (in particular, WO 2017/156213 A1 or WO 2017/156216 A1, and US 2017/113494 A1), it is not possible to arrive at the present invention.

In fact, any combination of the teachings provided by the currently known solutions (in particular, WO 2017/156213 A1 or WO 2017/156216 A1, and US 2017/113494 A1) fails to teach, suggest or disclose all the technical features of the tread wear monitoring method and system according to the present invention (in particular, the technical features of the tread wear model calibration step) and, hence, does not allow to achieve the technical advantages thereof (in particular, in terms of efficiency and reliability of tread wear estimation and RTM prediction).

In conclusion, it is clear that numerous modifications and variants can be made to the present invention, all falling within the scope of the invention, as defined in the appended claims.

The invention claimed is:

1. A tread wear monitoring method comprising a tread wear model calibration stage and a tread wear monitoring stage;

wherein the tread wear model calibration stage comprises determining a calibrated tread wear model based on tread-wear-related quantities and first frictional-energy-related quantities;

wherein the tread wear monitoring stage comprises acquiring, from a vehicle bus of a motor vehicle equipped with two or more wheels fitted, each, with a tire, driving-related quantities related to driving of the motor vehicle, computing second frictional-energy-related quantities related to frictional energy experienced, during driving, by a given tire of the motor vehicle by providing a predefined vehicle dynamics model that mathematically relates the acquired driving-related quantities to the second frictional-energy-related quantities, and computing the second frictional-energyrelated quantities by inputting the acquired driving-related quantities into the predefined vehicle dynamics model, performing a tread wear estimation comprising estimating tread wear experienced by the given tire of the motor vehicle during driving by computing, based on the second frictional-energy-related quantities computed and the calibrated tread wear model, a tread wear value indicative of a reduction in tread depth due to a distance driven by the motor vehicle, and performing a remaining tread material prediction comprising predicting remaining tread material of the given tire of the motor vehicle by computing a remaining tread depth based on the computed tread wear value and an initial tread depth.

2. The tread wear monitoring method of claim 1, wherein the remaining tread material prediction includes detecting an approaching end-of-life condition for the given tire of the motor vehicle if the remaining tread depth reaches a predefined threshold.

3. The tread wear monitoring method of claim 1, wherein the tread wear estimation and the remaining tread material prediction are carried out every N distance driven by the motor vehicle, wherein N denotes a predefined positive integer.

4. The tread wear monitoring method of claim 1, wherein the estimated tread wear and the predicted remaining tread material are corrected based on tread depth measurements performed via a tread depth measuring tool.

5. The tread wear monitoring method of claim 1, wherein the tread wear model calibration step further comprises:
    performing tread wear tests on one or more tires;
    measuring tread-wear-related quantities indicative of tread depth reductions resulting from the performed tread wear tests; and
    measuring the first frictional-energy-related quantities related to frictional energy which the tested one or more tires are subject to during the performed tread wear tests.

6. The tread wear monitoring method of claim 5, wherein determining the calibrated tread wear model comprises:
    providing a predefined reference tread wear model that mathematically relates frictional energy experienced by a tire along a driving route to tread wear caused by said frictional energy through given parameters;
    computing calibration values of the given parameters by inputting the measured tread-wear-related and first frictional-energy-related quantities into the predefined reference tread wear model; and
    determining the calibrated tread wear model by applying the computed calibration values in the predefined reference tread wear model.

7. A tread wear monitoring system comprising:
    an acquisition device coupled to a vehicle bus of a motor vehicle equipped with two or more wheels each fitted with a tire, and configured to acquire from the vehicle bus driving-related quantities related to driving of the motor vehicle;
    a processing system connected to the acquisition device to receive therefrom the driving-related quantities, and further configured to
        compute second frictional-energy-related quantities related to frictional energy experienced, during driving, by a given tire of the motor vehicle by providing a predefined vehicle dynamics model that mathematically relates the acquired driving-related quantities to the second frictional-energy-related quantities, and computing the second frictional-energy-related quantities by inputting the acquired driving-related quantities into the predefined vehicle dynamics model,
        perform a tread wear estimation comprising estimating tread wear experienced by the given tire of the motor vehicle during driving by computing, based on the computed second frictional-energy-related quantities and a calibrated tread wear model, a tread wear value indicative of a reduction in tread depth due to a distance driven by the motor vehicle, and
        perform a remaining tread material prediction comprising predicting remaining tread material of the given tire of the motor vehicle by computing a remaining tread depth based on the computed tread wear value and an initial tread depth; and
    a notification device configured to inform a user associated with the motor vehicle of the remaining tread material of the given tire of the motor vehicle predicted by the processing system.

8. The tread wear monitoring system of claim 7, wherein the notification device is configured to warn the user against an approaching end-of-life condition detected by the processing system for the given tire of the motor vehicle.

9. The tread wear monitoring system of claim 7, wherein:
    the processing system is a cloud computing system that is wirelessly and remotely connected to the acquisition device; and
    the notification device is an electronic communication device associated with the user and remotely connected to the cloud computing system via one or more wired and/or wireless networks.

10. The tread wear monitoring system of claim 7, wherein:
    the processing system is an electronic control unit installed on board the motor vehicle; and
    the notification device is a human-machine interface provided on board the motor vehicle.

11. The tread wear monitoring system of claim 7, wherein the calibrated tread wear model is determined based on tread-wear-related quantities and first frictional-energy-related quantities.

12. The tread wear monitoring system of claim 11, wherein the processing system is further configured in a tread wear model calibration stage to:
    perform tread wear tests on one or more tires;
    measure tread-wear-related quantities indicative of tread depth reductions resulting from the performed tread wear tests; and
    measure the first frictional-energy-related quantities related to frictional energy which the tested one or more tires are subject to during the performed tread wear tests.

13. The tread wear monitoring system of claim 12, wherein the processing system is further configured to determine the calibrated tread wear model by:
    providing a predefined reference tread wear model that mathematically relates frictional energy experienced by a tire along a driving route to tread wear caused by said frictional energy through given parameters;
    computing calibration values of the given parameters by inputting the measured tread-wear-related and first frictional-energy-related quantities into the predefined reference tread wear model; and determining the calibrated tread wear model by applying the computed calibration values in the predefined reference tread wear model.

14. A cloud computing system, configured to:
receive, from an acquisition device coupled to a vehicle bus of a motor vehicle equipped with two or more wheels each fitted with a tire, driving-related quantities related to driving of the motor vehicle;
compute second frictional-energy-related quantities related to frictional energy experienced, during driving, by a given tire of the motor vehicle by providing a predefined vehicle dynamics model that mathematically relates the acquired driving-related quantities to the second frictional-energy-related quantities, and computing the second frictional-energy-related quantities by inputting the acquired driving-related quantities into the predefined vehicle dynamics model;
perform a tread wear estimation comprising estimating tread wear experienced by the given tire of the motor vehicle during driving by computing, based on the computed second frictional-energy-related quantities and a calibrated tread wear model, a tread wear value indicative of a reduction in tread depth due to a distance driven by the motor vehicle; and
perform a remaining tread material prediction comprising predicting remaining tread material of the given tire of the motor vehicle by computing a remaining tread depth based on the computed tread wear value and an initial tread depth.

15. The cloud computing system of claim 14, wherein the calibrated tread wear model is determined based on tread-wear-related quantities and first frictional-energy-related quantities.

16. The cloud computing system of claim 15, further configured in a tread wear model calibration stage to:
perform tread wear tests on one or more tires;
measure tread-wear-related quantities indicative of tread depth reductions resulting from the performed tread wear tests; and
measure the first frictional-energy-related quantities related to frictional energy which the tested one or more tires are subject to during the performed tread wear tests.

17. The cloud computing system of claim 16, further configured to determine the calibrated tread wear model by:
providing a predefined reference tread wear model that mathematically relates frictional energy experienced by a tire along a driving route to tread wear caused by said frictional energy through given parameters;
computing calibration values of the given parameters by inputting the measured tread-wear-related and first frictional-energy-related quantities into the predefined reference tread wear model; and
determining the calibrated tread wear model by applying the computed calibration values in the predefined reference tread wear model.

18. An electronic control unit to be installed on board a motor vehicle equipped with two or more wheels each fitted with a tire, the electronic control unit configured to:
receive, from an acquisition device coupled to a vehicle bus of the motor vehicle, driving-related quantities related to driving of the motor vehicle;
compute second frictional-energy-related quantities related to frictional energy experienced, during driving, by a given tire of the motor vehicle by providing a predefined vehicle dynamics model that mathematically relates the acquired driving-related quantities to the second frictional-energy-related quantities, and computing the second frictional-energy-related quantities by inputting the acquired driving-related quantities into the predefined vehicle dynamics model;
perform a tread wear estimation comprising estimating tread wear experienced by the given tire of the motor vehicle during driving by computing, based on the computed second frictional-energy-related quantities and a calibrated tread wear model, a tread wear value indicative of a reduction in tread depth due to a distance driven by the motor vehicle; and
perform a remaining tread material prediction comprising predicting remaining tread material of the given tire of the motor vehicle by computing a remaining tread depth based on the computed tread wear value and an initial tread depth.

19. The electronic control unit of claim 18, wherein the calibrated tread wear model is determined based on tread-wear-related quantities and first frictional-energy-related quantities.

20. The electronic control unit of claim 19, further configured in a tread wear model calibration stage to:
perform tread wear tests on one or more tires;
measure tread-wear-related quantities indicative of tread depth reductions resulting from the performed tread wear tests; and
measure the first frictional-energy-related quantities related to frictional energy which the tested one or more tires are subject to during the performed tread wear tests.

21. The electronic control unit of claim 20, further configured to determine the calibrated tread wear model by:
providing a predefined reference tread wear model that mathematically relates frictional energy experienced by a tire along a driving route to tread wear caused by said frictional energy through given parameters;
computing calibration values of the given parameters by inputting the measured tread-wear-related and first frictional-energy-related quantities into the predefined reference tread wear model; and
determining the calibrated tread wear model by applying the computed calibration values in the predefined reference tread wear model.

* * * * *